United States Patent [19]

Ross

[11] 3,726,095
[45] Apr. 10, 1973

[54] GROUND FREEZING METHOD AND APPARATUS

[75] Inventor: John William Ross, Toronto, Ontario, Canada

[73] Assignee: Union Carbide Canada Limited, Toronto, Ontario, Canada

[22] Filed: Dec. 31, 1970

[21] Appl. No.: 103,089

[52] U.S. Cl. ................................................61/36 A
[51] Int. Cl. ..............................................E02d 3/12
[58] Field of Search ...........................61/36 R, 36 A

[56] References Cited

OTHER PUBLICATIONS

Construction Methods & Equipment, July 1964, pg. 85.

Primary Examiner—J. Karl Bell
Attorney—William George Hopley

[57] ABSTRACT

An apparatus and method of freezing a large volume of ground for tunnel construction and the like utilizing liquified nitrogen is described. The apparatus consists generally of a series of freeze pipes embedded in the ground, each of the freeze pipes consisting of a conductor tube and an inner header tube. The header tube of each of the succeeding freeze pipes in the series have discharge holes of a predetermined cross-section so that greater control of gaseous and liquified nitrogen pressure can be maintained throughout the system. By means of this method and apparatus more accurate control of ground freezing can be made by merely controlling the inlet liquified nitrogen pressure and the exhaust gaseous nitrogen temperature.

2 Claims, 4 Drawing Figures

GROUND FREEZING METHOD AND APPARATUS

GROUND FREEZING METHOD & APPARATUS

This invention relates to a method of ground freezing by means of liquid nitrogen. More particularly it relates to a method of providing uniform freezing of a given volume of ground by means of liquid nitrogen and the cold vapors of volatilized nitrogen as well as to an apparatus for carrying out the improved freezing method.

The technique of ground freezing has been used for many years as a means of reinforcing the walls of mine shafts, sewers, subway tunnels and other civil engineering jobs. Controlled freezing enables the tunnels to be drilled with greater accuracy and safety. For example in the paper of H.W. Miller and T.P. Gordon Brown in The Journal of Refrigeration of December 1967 page 338 entitled: Recent Developments in Ground Freezing a short history of ground freezing is given which indicates that a method of brine freezing of ground for the sinking of a mine shaft was used as early as 1862. Brine freezing is still used for some projects today notably the deep mining of potash reserves in Saskatchewan, Canada. By the use of brine, freezing can be carried out at great depths and the ice wall can be maintained over a long period of time, for example, up to one year.

Freezing with liquid nitrogen is more expensive than brine freezing and would be impractical for freezing large volumes of ground or for maintaining freezing conditions over prolonged periods of time. However, nitrogen provides much more rapid ground freezing than brine and because of the shorter freezing period can actually be less expensive for some construction jobs. This is possible because the rapid freezing does not require long delays in the tunnelling operations. For example, by using liquid nitrogen a three foot frozen wall can be produced in three days as opposed to four weeks for freezing the same size wall using brine freezing. In a tunnelling operation, for example, a section of wall can be frozen while a previously frozen section is excavated. The low temperatures achieved by means of liquid nitrogen holds the ground below freezing for a sufficient period of time to complete the excavating of the unfrozen core.

Previous attempts have also been made to use liquid nitrogen for ground freezing. In Compressed Air Magazine of January 1964 on page 16 an article entitled: "Another Job for Cryogenics" describes a means of freezing a 3 foot diameter main using liquid nitrogen. The liquid nitrogen was passed from a storage tank into copper tubes embedded in the ground. The nitrogen vaporized in the tubes and was exhausted to the atmosphere via another pipeline.

In the freezing of larger volumes of ground with liquid nitrogen however it was found that the temperature of any particular section of ground is difficult to control. Liquid nitrogen in one section of freeze pipe would provide deep freezing while rapid vaporization might provide a surprisingly high temperature in another section adjacent the freeze pipe. This phenomenon of surge boiling that causes "freeze pockets" in the system is believed to be due to pressure fluctuations in the two phase liquid and gaseous nitrogen system. It can be appreciated that this phenomenon is detrimental to a controlled freezing operation. It can also be dangerous since a section of wall may not be completely frozen and consequently might cave in during the tunnelling or drilling operation.

It has now been discovered that this problem of uneven ground freezing can be substantially reduced by providing a method of ground freezing wherein pressure fluctuation in the liquid and gaseous nitrogen system is substantially eliminated.

It is therefore an objection of this invention to provide an improved method of ground freezing by means of liquid nitrogen.

It is another object of this invention to provide an apparatus for ground freezing by means of nitrogen which provides more accurate control of the flow of nitrogen through the ground freezing system.

It is another object of this invention to provide an apparatus for ground freezing by means of nitrogen wherein the volume of ground freezing can be controlled by varying the inlet liquid nitrogen pressure and the exhaust gaseous nitrogen temperature in the apparatus.

These objects are obtained by means of an apparatus which comprises:

a. a plurality of freeze pipes connected in series, each of said freeze pipes consisting of a conductor tube closed at its upper and lower end and a header tube coaxially mounted in said conductor tube and extending therein substantially the length of said connector tube, said header tube having an opening at its lower end for discharging effluent into the lower end of said conductor tube;

b. means for connecting the upper end of the header tube of the first of said freeze pipes to a source of liquid nitrogen;

c. a conduit means whereby the upper end of the conductor tube of the first of said freeze pipe is placed in communication with the upper end of the header pipe of the second of said freeze pipes for passing therethrough the effluent of the header tube of the first of said freeze pipes;

d. a further conduit means at the upper end of the conductor tube of the second of said freeze pipes for discharging the effluent of the header tube of the second of said freeze pipes;

e. a plurality of holes in the lower portion of the header tube of the second of said freeze pipes spaced along at least a quarter of its length, the total cross-sectional area of said holes being equal to at least 200 percent of the cross-sectional area of the header tube.

These objects are also obtained by means of a method which comprises:

a. continually passing liquid nitrogen under pressure into the header tube of the first of said freeze pipes and discharging the nitrogen from the bottom of said header tube into the lower end of the conductor tube of the first of said freeze pipes and substantially filling said conductor tube with nitrogen;

b. passing the nitrogen overflow from the conductor tube of the first of said freeze pipe into the header tube of the second of said freeze pipes and then discharging nitrogen from said header tube into the conductor tube of the second of said freeze pipes through a plurality of apertures in said header tube, said apertures having a total cross-sectional area equal to at least 200 percent of the cross-sectional area of the header tube;

c. and discharging the nitrogen from the upper end of the conductor tube of the second of said freeze pipes, the passage of nitrogen through the plurality of freeze pipes being at such a rate that the nitrogen discharged from said freeze pipes has a temperature at least as low as −80°F.

Figure 1:
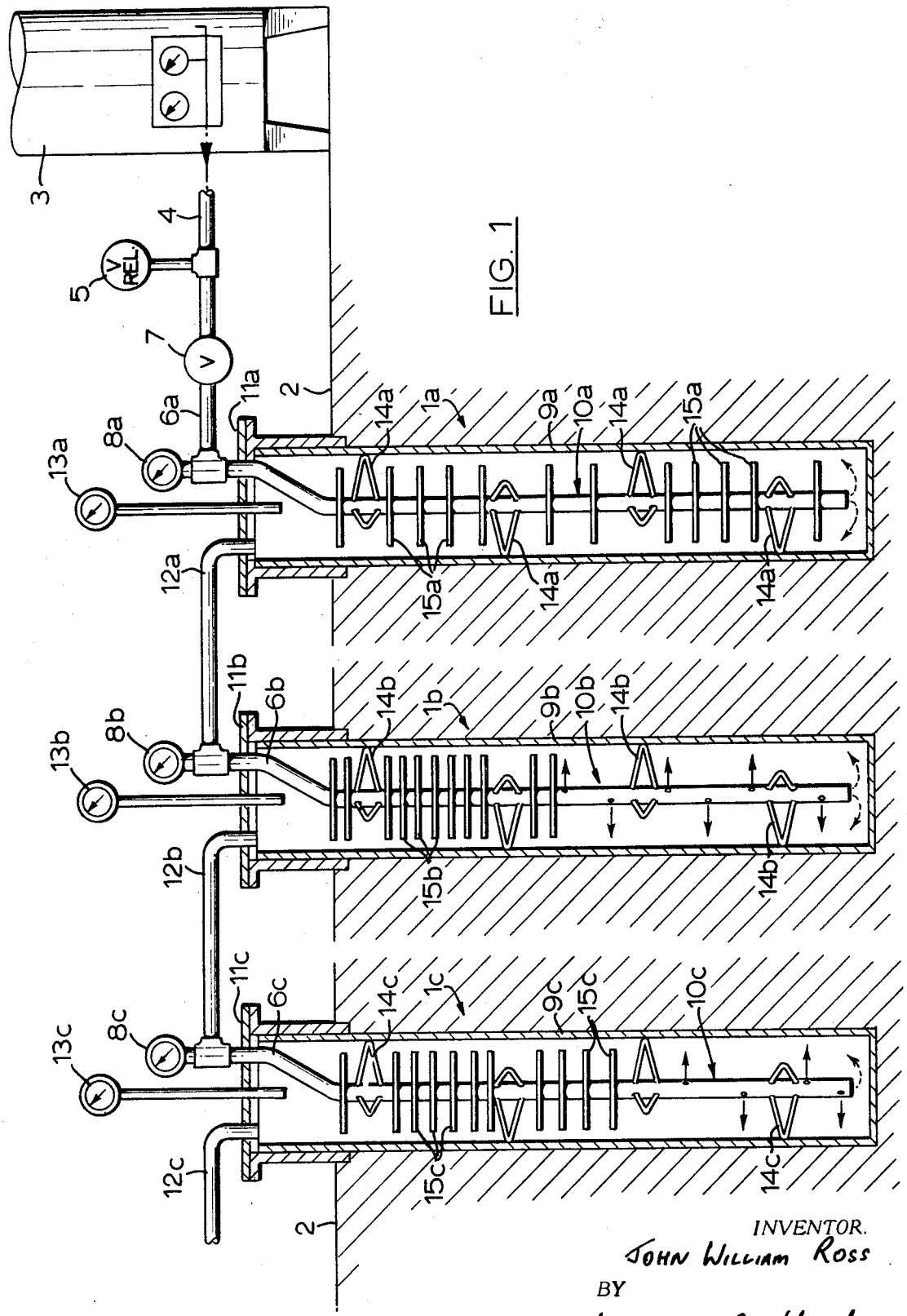
FIG. 1 is a partially diagramatic sectional elevation of one embodiment of the ground freezing apparatus.

In FIG. 1 three freeze pipes 1a, 1b and 1c are shown connected in series. Each of the freeze pipes is shown embedded in the ground 2 to a depth of 40 feet. The distance between the centers of pipe 1a and pipe 1b is 3.5 feet and the distance between the centers of pipe 1b and 1c is 2.5 feet. A tank 3 for liquid nitrogen is located above ground having a liquid nitrogen supply conduit 4 for feeding liquid nitrogen to the freeze pipes. A pressure relief valve 5 is located in the liquid nitrogen supply conduit 4 for purposes of safety.

The liquid nitrogen supply conduit is connected to the inlet conduit 6a of freeze pipe 1a. A flow control valve 7 is positioned between supply conduit 4 and inlet conduit 6a to control the delivery of liquid nitrogen to the freeze pipes. A pressure gauge 8a in inlet conduit 6a indicates the pressure of the liquid nitrogen entering the system. Freeze pipe 1a consists of an outer conductor tube 9a and an inner coaxially mounted header tube 10a. The conductor tube was embedded in the ground to a depth of 40 feet with approximately 1 ½ feet of pipe located above ground level. The portion above ground was insulated on the outside by means of polyurethane or neoprene insulation to reduce heat leak. The header tube 10a consists of copper or stainless steel tubing having an outside diameter of three-fourth inches and an inside diameter of 0.824 inches which extends from the inlet conduit 6a to approximately 6 inches from the bottom of the conductor pipe. An opening is provided at the bottom of the header pipe for discharging liquid nitrogen into conductor pipe 9a. The conductor pipe is 0.216 inches thick carbon steel pipe having an inside diameter of 3 inches. The conductor tube is flanged at its upper end and a flange plate 11a securely bolted to provide a gas tight seal. The flange plate has openings for passage of inlet conduit 6a as well as for outlet conduit 12a and pressure gauge 13a. The lower end of conductor tube 9a is closed by a plug which is welded to the tube end.

Approximately four support brackets 14a are spaced along the header tube 9a to position the header tube centrally in position in conductor tube 10a. The baffle plates 15a having a diameter of 2 ½ inches are positioned along header tube 10a approximately 3 feet apart. They serve to restrict the upward flow of liquid and gaseous nitrogen in a manner which will be explained below.

In freeze pipe 1a they serve mainly to reduce the bumping or boiling of the liquid nitrogen in conductor tube 9a which would produce relatively high temperatures in the ground area adjacent the bubble. It is most important that the boiling action of the liquid nitrogen be controlled in pipe 1a to avoid surging which would be detrimental to the uniform freezing action of the system.

Outlet conduit 12a in flange plate 11a is connected to inlet conduit 6b for passing liquid and vaporized nitrogen from conductor pipe 9a to header tube 10b in freeze pipe 1b. A pressure gauge 8b is positioned in inlet conduit 6b to measure the pressure of the gaseous nitrogen entering freeze pipe 1b. Conductor tube 9b has the same dimensions as conductor tube 9a and has a flange plate 11b securely fitted to its upper end and a plug at its lower end.

Header tube 10b differs from header tube 10a in several respects. Header tube 10b has four support brackets 14b and in the embodiment shown in FIG. 1 eleven baffle plates are evenly spaced along the header tube and ending about half way down. The lower half of the header tube contains a number of holes to allow the nitrogen vapors to be sprayed in conduit tube 9a. In this embodiment there are 100 holes spaced radially along the lower end of the pipe each of which has a diameter of 0.136 inches. In addition to these holes a cap is threaded onto the lower end of the header tube which has an axial hole 0.25 inches in diameter. The nitrogen entering header tube 10b from inlet conduit 6b is virtually all in the gaseous state. In order to obtain uniform freezing action in the system, the gaseous nitrogen is sprayed through these 101 holes rather than through a single discharge outlet as in header tube 10a. Baffles are again used in the gas pipes to provide back pressure and increase the gas velocity at the freeze pipe wall and thereby increase the rate of heat transfer. The baffles are located so as to give a uniform freezing action over the length of the freeze pipe. The gaseous nitrogen is discharged into the upper portion of conductor tube 9b and then through outlet conduit 12b. A pressure gauge 13b mounted in flange plate 11b indicates the pressure of nitrogen gas present in the upper end of conductor tube pipe 9b.

Outlet conduit 12b is connected to inlet conduit 6c of freeze pipe 1c whereby the nitrogen gas overflow from conductor tube 9b is discharged into header tube 10c. A pressure gauge 8c is located between outlet conduit 12b and inlet conduit 6c for measuring the pressure of the nitrogen gas entering header tube 10c of freeze pipe 1c. Header tube 10c is similar to header tube 10b except for the size of the spray holes in the lower half of the pipe. In the present embodiment, header tube 10c has 100 holes each having a diameter of 0.161 inches and a bottom hole in the threaded end cap of 0.50 inches. This increase in the diameter and therefore the total cross-sectional area of the header holes is to allow for the increased volume of the nitrogen as its temperature rose from the temperature in freeze pipe 1b. By compensating for the rise in temperature by increasing the drill hole volume, the pressure of the gas in the system will be stabilized. The number and positions of the support brackets 14c and baffle plates 15c are similar to header pipe 10b. An outlet conduit 12c is positioned in flange plate 11c for discharging nitrogen to the atmosphere. Pressure gauge 13c connected in flange plate 11c measures the pressure of the nitrogen at the upper discharge end of conductor pipe 9c.

It must be appreciated that while a three pipe system is preferred, satisfactory ground freezing was obtained using a two pipe system. In a system using five or more freeze pipes connected in series it would be difficult to obtain adequate and uniform freezing in all the pipes. Since the temperature of the nitrogen gas rises rapidly from one freeze pipe to another, the nitrogen would have to be pushed through the system at relatively high pressure to ensure freezing in the last freeze pipe. Another limiting factor is the increase in the cross-sectional area of the header holes necessary to maintain pressure equalization in the system and minimize the pressure drop in each pipe. A system using four freeze pipes would be satisfactory however and might even be preferred for some large tunnelling jobs.

In carrying out a ground freezing test using the apparatus described in FIG. 1 liquid nitrogen maintained in tank 3 at a pressure between 40 and 60 p.s.i. was delivered to header 10a via supply conduit 4 and inlet conduit 6a when flow control valve 7 was opened. The liquid nitrogen into conductor 1a had a supply pressure of 20 to 35 psig as recorded on pressure gauge 8a which corresponds to a consumption rate of between 8,000 and 1,0000 cu. ft. of nitrogen gas at NTP per hour for the freezing cycle. The liquid nitrogen in header tube 10a was discharged from the opening at the bottom of conductor tube 9a. Liquid nitrogen tended to build up in conductor tube 9a over a period of 24 hours until the tube was substantially full with some vaporized nitrogen at the upper discharge end adjacent outlet conduit 12a. As the liquid nitrogen rises in conductor tube 9a it vaporizes and rushes past the narrow passages between the baffle plates 15a and the tube wall. Without such baffle plates it was found that some vaporized nitrogen tended to bubble up through the liquid nitrogen in the pipe and tended to cause high pressure fluctuations known as "slugging" or "bumping." Another factor was the slow distribution of liquid nitrogen in the conductor pipe without baffle plates so that the nitrogen vaporized long before the liquid level reached the top. This resulted in uneven temperature distribution with relatively warmer temperatures at the upper end of the freeze pipe. Relatively even temperatures were maintained as a result of the baffle plates.

The overflow liquid nitrogen and nitrogen gas was carried over into header tube 10b via outlet conduit 12a and inlet conduit 6b. The nitrogen was then sprayed through the holes in the lower portion and the end of header tube 10b. The nitrogen filler the lower portion of conductor tube 9b and continued past the baffle plates 15b to the top of the conductor tube. Baffle plates 15b serve to restrict the upward passage to increase the gas velocity and force the nitrogen gas flow to contact the walls of the conductor tube. Without baffle plates the nitrogen gas might pass upward with increasing rapidity from the lower portion of the tube without extracting heat from the tube wall thus drastically reducing the cooling effect. Pressure gauge 12b recorded the pressure of the nitrogen gas at the top of the pipe.

The nitrogen gas overflow was carried over into header tube 10c via outlet conduit 12b and inlet conduit 6c. The pressure of the nitrogen gas entering header tube 10c was indicated by means of pressure gauge 8c. The gas was then sprayed through the holes in the lowe portion and out the end of the header tube. The cold nitrogen gas filled the lower portion of conductor tube 9c and continued upwardly passed the baffle plates 15c to the top of the conductor tube. The nitrogen overflow at the top of the conductor pipe was passed out to the atmosphere via outlet conduit 12c.

The freezing was continued for 96 hours during which time a total of 66,700 lbs of liquid nitrogen was passed through the freeze pipes. After 96 hours approximately 2,330 cubic feet of ground was frozen. The ambient temperature of the subsurface ground during the test was 50°F. The ground frozen during this test was a wet moderately dense silty clay. From thermocouples positioned in the ground at various distances from the freeze pipe it was found that the maximum thickness of the freeze zone around each pipe after 96 hours was as follows:

| Freeze pipe 1a | 6.4 feet |
| Freeze pipe 1b | 7.0 feet |
| Freeze pipe 1c | 5.0 feet |

The maximum thickness of the freeze zone was 7.4 feet and occurred about mid-way between pipes 1a and 1b. The maximum depth of the freeze zone was 10.7 feet. The temperature in the frozen soil itself varied between −320° and 32°F. It was found that in order to obtain this degree of freezing the nitrogen must pass through the freeze pipes at such a rate that the nitrogen gas discharging from outlet conduit 12c has a temperature of at least as low as −80°F and preferably as low as −100°F but should not be lower than −120°F for reasons of economy. The temperature of the discharge gas during the freeze cycle of the embodiment describedabove was approximately −90°F ± 5°in the initial freezing stage when some pressure fluctuation was observed between the freeze pipes. During the last 80 hours of the freezing cycle no pressure fluctuations were observed and the temperature of the gas discharged from conduit 12c was −90°F.

The pressure of the liquid nitrogen supplied to header pipe 1a was maintained between 20 and 35 psig which corresponds to a consumption rate of 8,000 to 10,000 cu. ft. of nitrogen per hour. During the first 16 hours which constitutes the initial cool-down period the pressure in the freeze pipes fluctuated in a cyclic fashion at the rate of about 20 cycles per hour. These fluctuations reached a maximum of 30 psig. After the initial cool-down period no cyclic fluctuations were observed. These fluctuations are caused by the boiling action in pipe 1a and were controlled by pressure and baffling.

The average change in enthalphy of the liquid nitrogen used was 162.9 BTU's per lb of liquid nitrogen which was distributed in the following proportions:

| Freeze pipe 1a | 84.4 BTU/lb |
| Freeze pipe 1b | 25.2 BTU/lb |
| Freeze pipe 1c | 23.7 BTU/lb |
| Total used in freeze pipes | 133.3 |
| Exhausted to air | 29.6 BTU/lb |
| | 162.9 |

Figure 2:
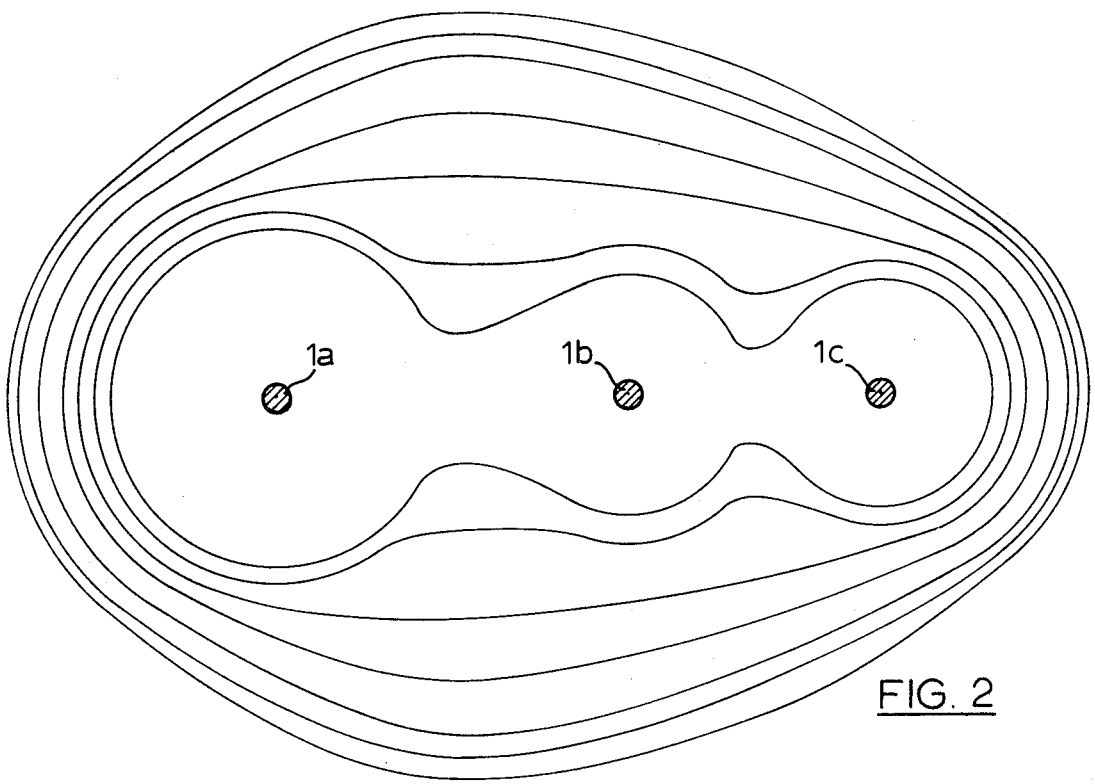
FIG. 2 is a graphic illustration showing the areas of ground freezing over various periods of time using the particular embodiment of the apparatus of FIG. 1.

The area of ground frozen at various periods of time up to 96 hours of freezing is illustrated in FIG. 2. This figure which is illustrated as a plan cross-section shows the temperature recorded by the strategically located thermocouples and indicates the temperatures at various distances from the freeze pipes at the end of predetermined time periods. Some 30 thermocouples were used to measure ground temperatures the full length of the freeze pipes and at various distances from he freeze pipes. It must be understood that these thermocouples were connected to a recording device above ground in a manner well known in the art. The area of ground frozen at various periods of time was found to be as follows:

| Time (hours) | Area (sq. ft.) |
|---|---|
| 24 | 17.90 |
| 36 | 24.45 |
| 48 | 32.40 |
| 60 | 40.10 |
| 72 | 48.80 |
| 84 | 53.80 |
| 96 | 58.30 |

A most important finding was that the freezing rates in the sub-surface soil can be predicted when the inlet nitrogen pressure is maintained at 25–35 psig and the exhaust gas temperature is maintained between −80° and −100°F. The isotherms shown in FIG. 2 are constant in shape and predictable with time for a particular soil. This enables the user to eliminate all of the thermocouples except one control thermocouple perpendicular to the mid point between pipes 1a and 1b. All of the pressure gauges shown in the test set up can be eliminated except 8a in the feed line. It can be appreciated that this greatly simplifies the control of freezing and the cost of the installation.

It can be seen from FIG. 2 of the drawings that maximum width of the frozen area is at a point about midway between freeze pipes 1a and 1b.

For carrying out these temperature measurements a total of 42 thermocouples were placed in the ground. These were made of 20 gauge copper-constantin thermocouple wire. A Sigma 110 temperature measuring pyrometer was used in conjunction with two 24 point thermocouple selector switches to record the ground temperatures. The pyrometer was equipped with an automatic resistance compensator to compensate for different lengths of thermocouples and an ambient temperature compensator to compensate for changes in ambient temperature. The accuracy of this instrument when operated at room temperature (70°F) was ± 1 percent full scale. Full scale deflection was 450°F, between −350°F and 100°F. This would give the temperature readings an accuracy of ± 4.5°F full scale deflection. In the test given above the temperature measuring pyrometer was operated at an ambient temperature between 0° and 40°F which is considerably lower than the optimum mechanical operation temperature of the instrument This may have caused a slight decrease in the accuracy of the readings.

It was observed that the nitrogen ground freezing process was more economical during the first part of the freezing cycle and becomes less economical as the freezing cycle time increases. This is evident by the decrease in the rate of growth of the frozen area as the freezing cycle duration increases.

The volume of ground in the frozen zone was approximated by projecting the frozen area obtained after a given time interval knowing the length of the freeze pipes below the ground to be to a depth of 40 feet. During the test the frozen zone extended from 0 to 2 feet below the freeze pipes. This was a good approximation of the actual frozen zone below ground and was used in the volume calculations. The total volume of frozen ground obtained after the 96 hour freezing cycle was (58.3 × 40) = 2,330 cu.ft.

During the 96 hours freezing cycle:

| | |
|---|---|
| Liquid nitrogen consumed | 66700 lbs |
| Volume of frozen ground | 2330 cu. ft. |
| Density of ground frozen was found to be | 110 lbs/cu.ft. |
| Weight of ground frozen | 110 × 2330 = 256,000 lbs. |

Therefore, 1 lb of liquid nitrogen froze 3.85 lbs of ground.

The thawing cycle lasted 403 hours. This was the time required for the temperature of the frozen ground to increase to 32°F or higher and was 4.2 times as long as the freezing cycle. The thawing cycle is expected to be longer than the freezing cycle due to the fact that the ambient underground temperature was only 50°F and the subcooled ice wall produced by freezing had a mass mean temperature of +10°F. Therefore the thermal gradient during the thaw period was much less than during the freeze period.

A similar test was carried out using a two pipe system. In this embodiment a liquid nitrogen freeze pipe such as shown in FIG. 1 as 1a and a single gaseous nitrogen freeze pipe such as 1b were connected in series. The other elements in the apparatus were similar to those shown in FIG. 1. The freeze pipes in this test were only embedded into the earth a depth of 20 feet and placed 2 feet apart from their centers.

The liquid nitrogen supply pressure to the header pipe of the first freeze pipe was maintained between 7 and 10 psig during most of the freezing cycle. The average freeze pipe temperature for the first 24 hours and the last 47 hours are given below for a 71 hour freeze cycle:

First Freeze Pipe (mostly liquid N₂)
| | | | |
|---|---|---|---|
| Bottom wall temperature | = −296°F | 1st | 24 hours |
| | = −311°F | 2nd | 47 hours |
| Upper wall temperature | = −50°F | 1st | 24 hours |
| | = −252°F | 2nd | 47 hours |
| Exhaust Nitrogen gas | = −222°F | 1st | 24 hours |
| | = −291°F | 2nd | 47 hours |

Second Freeze Pipe (mostly Gaseous N₂)
| | | | |
|---|---|---|---|
| Bottom walltemperature | = −11°F | 1st | 24 hours |
| | = −117°F | 2nd | 47 hours |
| Upper Wall Temperature | = −31°F | 1st | 24 hours |
| | = −139°F | 2nd | 47 hours |
| Exhaust Nitrogen Gas | = −88°F | 1st | 24 hours |
| | = −189°F | 2nd | 47 hours |

During this second test a total of 308,800 cu. ft. or approximately 22,400 lbs of liquid nitrogen was used over the 71 hour period.

The second freeze pipe was originally equipped with a liquid spray header but this was changed to a gas spray header as shown in item 10b of FIG. 1 after 24 hours. This was done because the liquid spray header offered too much restriction to nitrogen flow which prevented the obtaining of liquid nitrogen temperatures in the first freeze pipe. This change in header tube in the first freeze pipe accounts for the great difference in temperatures of the first freeze pipe in the last 47 hours.

Figure 3:
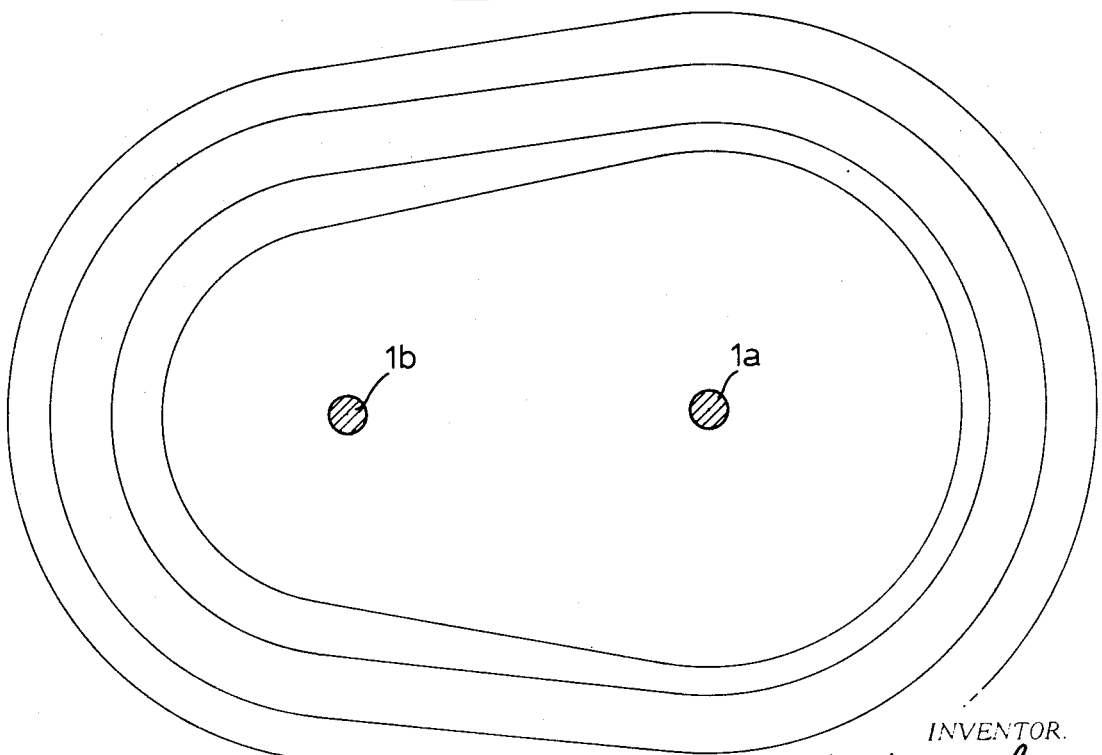
FIG. 3 is an isotherm chart showing the areas of ground frozen over increasing time periods.

FIG. 3 illustrates the radius of the freeze zone at various periods of time during the test of the two freeze pipe system. These temperatures were recorded by means of 19 thermocouples stratigically positioned in the ground. The radius of the freeze zone over the 71 hour freeze cycle is as follows:

| Time (Hours) | Radius of Frozen Zone (ft.) | |
|---|---|---|
| | First Pipe | Second Pipe |
| 24 | 1.39 | 1.02 |
| 40 | 1.54 | 1.28 |
| 56 | 1.85 | 1.62 |
| 71 | 2.12 | 1.84 |

The total area of the frozen zone after 71 hours was 20.19 sq. ft. and the total volume was 404 cubic feet. The ground in the second test was a relatively dry glacial till having a density of 150.5 lbs/cu. ft. The weight of ground frozen was therefore:

density × volume = 150.5 × 404 = 6.07 × $10^4$ lbs.

Since 22,400 lbs of nitrogen was used then 1 lb of nitrogen froze 2.71 lbs of ground.

The results obtained in test one and two are shown below for purposes of comparison:

COMPARISON SUMMARY

| Apparatus | Test 1<br>1 Liquid $N_2$ pipe<br>2 Gas $N_2$ pipes | Test 2<br>1 Liquid $N_2$ pipe<br>1 Gas $N_2$ pipes |
|---|---|---|
| Freezing cycle time | 96 hours | 71 hours |
| Liquid $N_2$ consumption | 66700 lbs | 22400 lbs |
| Liquid $N_2$ consumption rate | 695 lbs/hr | 316 lbs/hr. |
| Thickness of frozen zone | | |
| Pipe 1 | 6.4 ft | 4.24 ft |
| Pipe 2 | 7.0 ft | 3.74 ft |
| Pipe 3 | 5.0 ft | |
| Maximum ice wall thickness between pipes 1 & 2 | 7.4 ft | 4.24 ft |
| Length of frozen zone | 10.7 ft | 5.97 ft |
| Surface area of frozen zone | 58.3 sq. ft. | 20.2 sq. ft. |
| Depth of frozen ground | 40 ft. | 20 ft. |
| Volume of frozen ground | 2330 cu. ft. | 404 cu. ft. |
| Liquid $N_2$ freezing efficiency | 3.85 lbs of soil per lb of $N_2$ | 2.71 lbs of soil per lb of $N_2$ |
| Average temperature of Exhaust gas | −90°F | −156°F |

| | Test 1 | Test 2 |
|---|---|---|
| Refrigeration obtained from freeze pipe 1 | 84.4 btu/lb | 87.0 btu/lb |
| Refrigeration obtained from freeze pipe 2 | 25.2 btu/lb | 28.7 btu/lb |
| Refrigeration obtained from freeze pipe 3 | 23.7 btu/lb | |
| Refrigeration obtained from total freeze pipes | 133.3 btu/lb | 115.7 btu/lb |
| Refrigeration exhausted to atmosphere | 29.6 btu/lb | 51.4 btu/lb |
| Ambient soil temperature | 50°F | 46°F |

While the embodiments described above use a two or three pipe system, an apparatus using four or more pipes can also be used. In order to ensure regular passage of the nitrogen and effectively eliminate pressure fluctuation throughout the pipes the cross-sectional area of the holes in the header tubes must be progressively increased in each succeeding freeze pipe. Thus as indicated above with reference to FIG. 1 the cross-sectional area of the total holes in the header tube 10b constitutes 400 percent of the cross-section of the header tube itself. In header tube 1c this figure was 500 percent. If a fourth pipe was used the cross-sectional area of the holes in the fourth header tube would constitute a much higher percentage of the tube cross-section. It can be appreciated however that four pipes are about the limit for practical commercial ground freezing.

The temperature of the nitrogen in a fifth pipe would be unsuitable for effectively freezing a large area of ground unless the total nitrogen is pushed through the freeze pipe system at much higher pressures. Much higher pressure would be impractical however using present day delivery systems.

Figure 4:
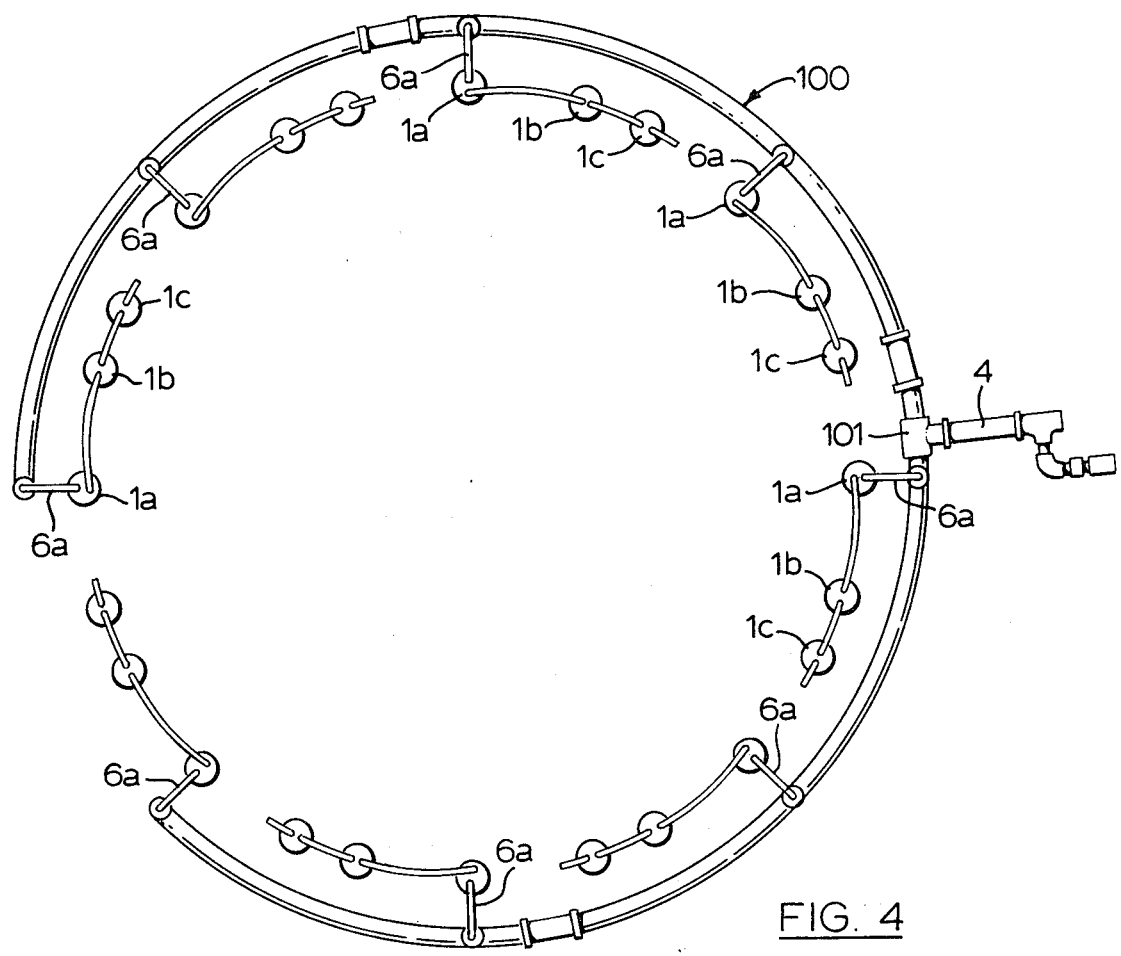
FIG. 4 is a diagramatic illustration in plan view showing 8 ground freezing units connected in a circle to a liquid nitrogen source to freeze a circular wall for tunnel construction.

If large areas of ground are to be frozen a suitable alternative is to connect a number of three pipe systems in parallel as shown in FIG. 4.

FIG. 4 shows a circular lay-out showing eight freeze pipe systems connected in parallel, each of which consists of three freeze pipes connected in series. The freeze pipes are similar to those described with reference to FIG. 1 and are therefore indicated as pipes 1a, 1b and 1c as noted in FIG. 1. In this embodiment it can be observed however that the distance between pipes 1a and 1b is greater than the distance between pipes 1b and 1c.

Liquid nitrogen from a supply tank (not shown) is directed via nitrogen supply conduit 4 to feeder pipe 100. This pipe is located above ground and is heavily insulated to reduce temperature loss to a minimum. Feeder pipe 100 is connected to supply conduit 4 by means of a tee joint 101 so that liquid nitrogen is fed to both areas of the circle formed by the feeder pipe. Nitrogen is then fed to the inlet conduit 6a of each of the freeze pipes 1a via opening along the feeder pipe. In the embodiment shown the freeze pipes 1a are spaced approximately 8 feet 6 inches apart along the circumference of the circle. The distance between freeze pipes 1c and the succeeding pipe 1a is approximately 3 feet. By means of the feeder pipe shown in this embodiment the series of freezer pipes are aligned to define a circumference of 78.6 feet. Such an embodiment may be used to freeze the circumferential area of a large shaft so that the walls will not collapse before the concrete lining reinforcement is installed.

I claim:

1. A ground freezing apparatus comprising:

a. a plurality of freeze pipes connected in series, each of said freeze pipes consisting of a conductor tube closed at its upper and lower end and a header tube coaxially mounted in said conductor tube and extending therein substantially the length of said connector tube, said header tube having an opening at its lower end for discharging effluent into the lower end of said conductor tube;

b. means for connecting the upper end of the header tube of the first of said freeze pipes to a source of liquid nitrogen;
c. a conduit means whereby the upper end of the conductor tube of the first of said freeze pipes is placed in communication with the upper end of the header tube of the second of said freeze pipes for passing therethrough the effluent of the header tube of the first of said freeze pipes;
d. a plurality of holes in the lower portion of the header tube of the second of said freeze pipes spaced along at least a quarter of its length, the total cross-sectional area of said holes being equal to at least 200 percent of the cross-sectional area of the header tube;
e. a further conduit means at the upper end of the conductor tube of the second of said freeze pipes for discharging the effluent from the header tube of the second of said freeze pipes into the upper end of the header tube of the third of said freeze pipes and a discharge means at the upper end of the conductor tube of the third of said freeze pipes for discharging said effluent;
f. a plurality of holes in the lower portion of the header tube of the third of said freeze pipes spaced along at least a quarter of its length, the total cross-sectional area of said holes being equal to at least 400 percent of the cross-sectional area of the header tube.

2. A ground freezing apparatus as claimed in claim 1 wherein a plurality of baffle plates are spaced along at least a portion of each of said freeze pipes thereby constricting the passage between the header tube and the conductor tube.

* * * * *